(12) United States Patent
Shindo et al.

(10) Patent No.: US 8,848,408 B2
(45) Date of Patent: Sep. 30, 2014

(54) DISCHARGE CONTROL DEVICE OF ELECTRIC POWER CONVERSION SYSTEM

(75) Inventors: Yusuke Shindo, Nagoya (JP); Tsuneo Maebara, Nagoya (JP); Koichi Sakata, Okazaki (JP)

(73) Assignees: Denso Corporation, Kariya (JP); Toyota Jidosha Kabushiki Kaisha, Toyota-shi (JP)

( * ) Notice: Subject to any disclaimer, the term of this patent is extended or adjusted under 35 U.S.C. 154(b) by 28 days.

(21) Appl. No.: 13/502,165

(22) PCT Filed: May 11, 2011

(86) PCT No.: PCT/JP2011/060811
§ 371 (c)(1),
(2), (4) Date: Apr. 16, 2012

(87) PCT Pub. No.: WO2011/142373
PCT Pub. Date: Nov. 17, 2011

(65) Prior Publication Data
US 2012/0212160 A1  Aug. 23, 2012

(30) Foreign Application Priority Data

May 14, 2010  (JP) ................ 2010-112013

(51) Int. Cl.
*H02H 7/122*  (2006.01)
*B60L 3/00*  (2006.01)
(Continued)

(52) U.S. Cl.
CPC ............. *H02M 7/48* (2013.01); *Y02T 10/7005* (2013.01); *B60L 2210/14* (2013.01); *B60L 3/0007* (2013.01); *H02M 7/538* (2013.01); *Y02T 10/7225* (2013.01); *H02M 2001/322* (2013.01); *B60L 11/1803* (2013.01); *B60L 3/0069* (2013.01); *B60L 3/04* (2013.01)
USPC .......... 363/56.02; 307/10.1; 180/279; 361/18

(58) Field of Classification Search
USPC ................ 363/50, 55, 56.01–56.12, 98, 132; 307/9.1, 10.1, 10.3, 10.6, 10.7; 361/18, 361/23, 30, 42; 315/77, 78, 79, 80; 320/166; 180/279
See application file for complete search history.

(56) References Cited

U.S. PATENT DOCUMENTS 5,412,558 A * 5/1995 Sakurai et al. ................. 363/98
5,483,436 A * 1/1996 Brown et al. ................... 363/98
(Continued)

FOREIGN PATENT DOCUMENTS

JP         9-201065        7/1997
JP         2002-233152     8/2002
(Continued)

OTHER PUBLICATIONS

International Preliminary Report on Patentability, dated Nov. 29, 2012, issued in corresponding International Application No. PCT/JP2011/060811, with English translation.
(Continued)

*Primary Examiner* — Gary L Laxton
*Assistant Examiner* — Alex Torres-Rivera
(74) *Attorney, Agent, or Firm* — Nixon & Vanderhye PC (57) ABSTRACT

In an electric power conversion system having a discharge control device capable of discharging a voltage charged in a capacitor to a voltage of not more than a predetermined voltage, a linear regulator decreases a voltage of the capacitor and outputs the decreased voltage to a drive unit at a bottom arm in a U phase. A flyback converter for discharging use inputs an output of the linear regulator, and outputs electric power to a drive unit at an upper arm in the U phase. When detecting that own vehicle collides with an obstacle, the discharge control device starts to execute discharge control of the capacitor by turning off a photo coupler and turning on the linear regulator.

9 Claims, 7 Drawing Sheets

(51) Int. Cl.
*H02M 7/538* (2007.01)
*H02M 7/48* (2006.01)
*B60L 11/18* (2006.01)
*B60L 3/04* (2006.01)
B60L 1/00 (2006.01)
B60K 28/10 (2006.01)
H02M 1/32 (2007.01)

(56) References Cited

U.S. PATENT DOCUMENTS

| | | | | |
|---|---|---|---|---|
| 6,097,107 | A * | 8/2000 | Ikeda | 307/10.7 |
| 2007/0029942 | A1* | 2/2007 | Jeong et al. | 315/169.4 |
| 2010/0045104 | A1* | 2/2010 | Hirasawa | 307/9.1 |
| 2010/0214055 | A1* | 8/2010 | Fuji et al. | 340/3.1 |
| 2011/0080149 | A1* | 4/2011 | Fukuta et al. | 323/284 |
| 2011/0221374 | A1* | 9/2011 | Maebara et al. | 318/494 |
| 2011/0278918 | A1* | 11/2011 | Shindo et al. | 307/9.1 |
| 2012/0055727 | A1* | 3/2012 | Omiya et al. | 180/279 |

FOREIGN PATENT DOCUMENTS

| | | |
|---|---|---|
| JP | 2003-9540 | 1/2003 |
| JP | 2005-229689 | 8/2005 |
| JP | 2009-130967 | 6/2009 |
| JP | 2009-232620 | 10/2009 |
| JP | 2011-209877 | 10/2011 |
| JP | 2011-217483 | 10/2011 |
| JP | 4835743 | 10/2011 |

OTHER PUBLICATIONS

International Search Report for PCT/JP2011/060811, mailed Aug. 16, 2011.

* cited by examiner

FIG.7

DISCHARGE CONTROL DEVICE OF ELECTRIC POWER CONVERSION SYSTEM

This application is the U.S. national phase of International Application No. PCT/JP2011/060811 filed 11 May 2011 which designated the U.S. and claims priority to JP Patent Application No. 2010-112013 filed 14 May 2010, the entire contents of each of which are hereby incorporated by reference.

TECHNICAL FIELD

The present invention relates to discharge control devices for electric power conversion systems capable of converting an electric power of a power source to a predetermined electric power, and the discharging control device discharges a voltage charged in a capacitor in the electric power conversion system to a desired voltage of not more than a specified voltage.

BACKGROUND ART

Electric power conversion systems have been used in motor vehicles, houses, plants, etc. Such electric power conversion systems convert an electric power of a power source to a predetermined electric power, for example, converts a direct current electric power to an alternating electric power.

Such a type of the electric power conversion system is comprised of an electric power conversion circuit, a capacitor, and an electrical switching means. The electric power conversion circuit has a series connection unit comprised of a switching element in a high voltage potential and a switching element in a low voltage potential which are connected in series. The electric power conversion circuit converts an electric power of a direct current power source to a predetermined electric power, for example, converts a direct current power to an alternating current power. The capacitor is placed between the electric power conversion circuit and the DC power source. The electrical switching means opens and closes electrical connections between the electric power conversion circuit, the capacitor and the direct current power source. When the electrical switching means is open, the discharge control device for the electric power conversion system controls the switching element at a high voltage potential and the switching element at a low voltage potential to discharge the voltage charged in the capacitor to a voltage of not more than a predetermined voltage.

For example, because an inverter (as an electric power conversion circuit), etc. connected to a motor generator as a vehicle main engine receives a very high voltage, the inverter, etc. are placed in an on-vehicle high voltage system. Such an on-vehicle high voltage system is electrically insulated from an on-vehicle low voltage system. The on-vehicle low voltage system is comprised generally of an on-vehicle control device, etc. A power source for supplying an electric power to a drive circuit for each of switching elements in the inverter is comprised of an insulation type converter. An input terminal of the insulation type converter is electrically connected to a battery placed in the on-vehicle low voltage system.

By the way, such a capacitor is generally connected to the input terminal of the inverter in order to smooth the voltage between the pair of the input terminals of the inverter. It is necessary to discharge the capacitor when the inverter is stopped.

For example, as disclosed by the following patent document 1, there has been proposed a technique for making a short circuit between both electrodes of a capacitor by turning on a switching element at a high voltage potential and a switching element at a low voltage potential simultaneously in order to discharge electric power charged in the capacitor. The capacitor is connected to a pair of input terminals of the inverter.

PRIOR ART TECHNICAL DOCUMENT

Patent document

Patent document 1: Japanese patent laid open publication No. JP 2009-232620

SUMMARY OF THE INVENTION

Problem to be Solved by the Invention

However, when a motor vehicle collides with an obstacle, the motor vehicle enters an abnormal condition. When the collision causes disconnection between a low voltage system and a high voltage system, no electric power is supplied to the drive circuit, there is a possibility for the discharging control device not to execute the above discharge control.

The present invention is invented to solve the above problems. It is an object of the present invention to provide a discharge control device for an electric power conversion system capable of correctly and efficiently executing a discharge control of discharging electric power of a capacitor even if an abnormal or a failure occurs in an apparatus (for example, a motor vehicle) to which the electric power conversion system is mounted. The electric power conversion system has the voltage conversion circuit and the capacitor. The voltage conversion circuit has a series connection unit in which a switching element at a high voltage potential and a switching element at a low voltage potential are connected in series. The voltage conversion circuit converts an electric power of a direct current power source to a predetermined electric power, for example, converts a direct current power to an alternating current power. The capacitor is placed between the input terminal of the voltage conversion circuit and the direct current power source.

Means for Solving the Above Problems

Hereinafter, a description will be given of means, actions and effects of the present invention to solve the above problems.

A first example embodiment of present invention provides a discharge control device which is applied to an electric power conversion system. The electric power conversion system is comprised of an electric power conversion circuit, a capacitor and an electrical switching means, the electric power conversion circuit. The electric power conversion circuit is equipped with a series connection unit. The series connection unit is composed of a switching element at a high voltage side and a switching element at a low voltage side connected in series. The electric power conversion circuit converts a direct current power of a direct current power source to a predetermined electric power. The capacitor is placed between an input terminal of the electric power conversion circuit and the direct current power source, the electrical switching means opens and closes electrical connections between the electric power conversion circuit, the capacitor and the direct current power source. The discharge control device is comprised of a discharge control means, a first power source and a second power source. The discharge control means adjusts a charged voltage of the capacitor to a voltage of not more than a predetermined voltage by operating the switching element at a high voltage side and the switching element at a low voltage side when the electrical switching means is turned off. The first power source generates a supplying voltage, by decreasing the voltage of the capacitor, to be supplied to a driving circuit for controlling one of the switching element at a high voltage side and the switching element at a low voltage side controlled by the discharge control means. The second power source receives the electric power of the first power source and generates a supplying voltage to be supplied to a driving circuit for controlling the other switching element in the switching element at a high voltage side and the switching element at a low voltage side controlled by the discharge control means.

Because the electric power of the capacitor is supplied to the driving circuit for the switching element at a high voltage side and the driving circuit for the switching element at a low voltage side, which are controlled by the discharge control means, it is possible to certainly supply the electric power to the driving circuit even if an abnormal state occurs in a member to which the electric power conversion system is mounted. Further, because the second power source receives the electric power of the first power source and generates the supplying voltage, it is possible to decrease a withstanding function required by the second power source.

The discharge control device recited in a second example embodiment has a feature in which the second power source comprises an insulated type converter.

Because a difference in voltage potential between the driving circuit for the switching element at a high voltage side and the driving circuit for the switching element at a low voltage side, it is necessary to transmit the electric power in an area having a large difference in voltage potential when the electric power of the first power source is supplied to the second power source. In this viewpoint, because the discharge control device uses the insulation converter, it is possible to transmit the electric power while the driving circuit for the switching element at a high voltage side is electrically insulated from the driving circuit for the switching element at a low voltage side. This provides an effect to form the second power source without using any element capable of withstanding a high voltage.

The discharge control device for the electric power conversion system recited in a third example embodiment has the following feature. In the structure recited in the second example embodiment, the electric power conversion system is an on-vehicle high voltage system which is insulated from an on-vehicle low voltage system. The drive circuit for controlling the switching element at a high voltage side and the drive circuit for controlling the switching element at a low voltage side are arranged adjacent to each other on a circuit substrate. A transformer forming the insulation type converter is arranged between the drive circuit for controlling the switching element at a high voltage side and the drive circuit for controlling the switching element at a low voltage side.

The discharge control device for the electric power conversion system recited in a fourth example embodiment has the following feature. In the structure recited in any one of the first through third example embodiments, the first power source is comprised of a linear regulator, and generates a voltage to be supplied to the drive circuit for controlling the switching element at a low voltage side.

The discharge control device for the electric power conversion system recited in a fifth example embodiment had the following feature. In the structure recited in fourth example embodiment, the linear regulator is arranged between the capacitor and the electric power conversion circuit and is comprised of a plurality of switching element connected in series.

The above structure of the discharge control device makes it possible to decrease the withstanding voltage required to the connection node between the input terminal and the output terminal in each of the switching elements which form the linear regulator.

The discharge control device for the electric power conversion system recited in a sixth example embodiment has the following feature. In the structure recited in the fifth example embodiment, the electric power conversion circuit is a direct current to alternating current conversion circuit connected to an electric rotary machine. A booster converter is placed between the direct current to alternating current conversion circuit and the direct current power source. The capacitor is connected to the output terminal of the booster converter.

In general, the voltage of the capacitor is easy to increase and the withstanding voltage of the switching element forming the first power source is easy to increase. The structure of the present invention recited in the fifth example embodiment can solve the above drawback.

The discharge control device for the electric power conversion system recited in seventh example embodiment has the following feature. In the structure recited in any one of the first through sixth example embodiments, the electric power conversion circuit is a direct current to alternating current conversion circuit connected to an electric rotary machine.

The discharge control device for the electric power conversion system recited in an eighth example embodiment has the following feature. In the structure recited in any one of the first through seventh example embodiments, the discharge control means turns on the switching element at a high voltage side and the switching element at a low voltage side in order to make a short circuit of both electrodes of the capacitor, and to execute the discharge control of decreasing a voltage charged in the capacitor to a voltage of not more than a predetermined voltage.

The discharge control device for the electric power conversion system recited in seventh example embodiment has the following feature. In the structure recited in any one of the first through eighth example embodiments, the discharge control device further has a detecting means of detecting whether or not an emergency occurs in a member onto which the electric power conversion system is mounted. The discharge control means turns on the switching element at a high voltage side and the switching element at a low voltage side in order to make a short circuit between both electrodes of the capacitor and execute the discharge control of decreasing the voltage charged in the capacitor to a voltage of not more than the predetermined voltage when the detection means indicates that an emergency occurs in the member.

BRIEF DESCRIPTION OF THE DRAWINGS

FIG. 3 (A) to (F) are timing charts showing the discharge control executed by the discharge control device according to the first embodiment during an emergency.

FIRST EMBODIMENT

A description will be given of an electric power conversion system comprised of a discharge control device according to a first embodiment of the present invention with reference to drawings. In the first embodiment, the electric power conversion system is applied to a hybrid motor vehicle.

Figure 1:
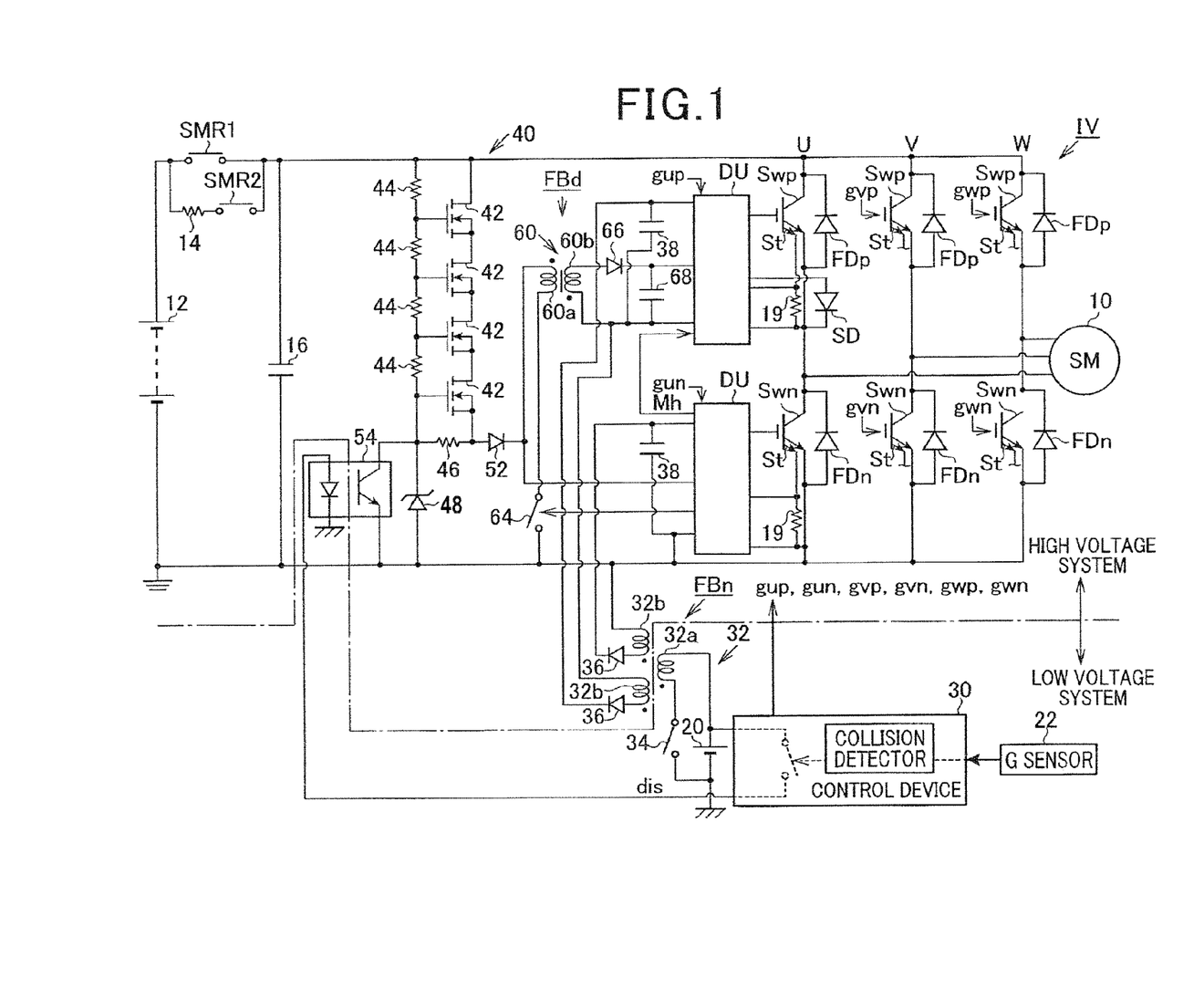
FIG. 1 is a view showing a system configuration of an electric power conversion system comprised of an electric power conversion circuit (inverter) and a discharge control device according to a first embodiment of the present invention.

FIG. 1 is a view showing a system configuration of the electric power conversion system according to the first embodiment of the present invention. The motor generator 10 serves as a vehicle main engine. The motor generator 10 is mechanically connected to the driving wheels of the motor vehicle. The motor generator 10 is connected to a high voltage battery 12 through an inverter IV and a parallel connection unit. The parallel connection unit is comprised of a relay SMR2, a resistance 14 and a relay SMR1. The high voltage battery 12 supplies a high voltage of not less than several hundred volts, for example. Input terminals at the Inverter IV side of the inverter IV1 are connected in parallel to the capacitor 16.

The inverter IV is comprised of three connection units which are connected in parallel to each other. Each of the connection units is composed of a power switching element Swp at a high voltage side and a power switching element Swn at a low voltage side. A connection node between the power switching element Swp at a high voltage side and the power switching element Swn at a low voltage side in each of the three connection units is connected to the corresponding phase terminal of the motor generator 10.

The anode and cathode of a freewheel diode FDp are connected between the input and output terminals (between the collector and the emitter) of the power switching element Swp at a high voltage side, respectively. The anode and cathode of a freewheel diode FDn are connected between the input and output terminals (between the collector and the emitter) of the power switching element Swn at a low voltage side, respectively. Each of the power switching elements Swp and Swn is comprised of an insulated gate bipolar transistor (IGBT). Each of the power switching elements Swp and Swn is equipped with a sense terminal St through which a small current is output. The value of the small current supplied through the sense terminal St indicates a correlation with a current flowing between the input terminal and the output terminal of the power switching element Swp and Swn.

The small current output through the sense terminal St flows through a shunt resistance 19. The voltage corresponding to the voltage drop at the shunt resistance 19 is supplied to the drive unit DU. This drive unit DU drives the power switching element Sw# (#=p or n). The drive units DU for the V phase and W phase are omitted from drawings. The drive unit DU forcedly instructs the corresponding power switching element Sw# to be turned off when the current flowing between the input terminal and the output terminal of the power switching element Sw# is not less than a predetermined threshold current Ith on the basis of the voltage drop in the shunt resistance 19.

On the other hand, an electric control device 30 receives electric power supplied from a low voltage battery 20. The control device 30 operates the inverter IV in order to adjust control values of the motor generator 10 as a control target. In more detail, the control device 30 inputs detection signals from various sensors (not shown) and generates and outputs operation signals gup, gyp and gwp and operation signals gun, gvn and gwn on the basis of detection results transferred from the various sensors. These operation signals gup, gyp and gwp are used for controlling the power switching elements Swp of the inverter IV, which correspond to the U phase, V phase and W phase. The operation signals gun, gvn and gwn are used for controlling the power switching elements Swn of the inverter IV, which correspond to the U phase, V phase, and W phase. The control device 30 controls the operation of the power switching elements Swp and Swn through the drive units DU. The drive units DU is connected to a conductive control terminal (gate) of the corresponding power switching element Swp, Swn.

By the way, the high voltage system equipped with the inverter IV is electrically insulated from the low voltage system having the control device 30 through an insulation means such as a photo coupler omitted from drawings. The operation signals g*#(*=u, v, w, #=p, n) are output to the high voltage system side through the insulation means.

The drive unit DU uses electric power supplied from the flyback converter FBn. Such a flyback converter FBn is an insulation type converter for supplying the electric power of the low voltage battery 20 to the upper arm and the lower arm. That is, the primary coil 32a of the transformer 32 stores electric power supplied from the low voltage battery 20 when the electric power switching element 34 is turned on. At this time, the diode 36 prevents a current from flowing through the secondary coil 32b. On the other hand, current flows through the secondary coil 32b and an ordinary use capacitor 38 is charged when the electric power switching element 24 is turned off. The driver units DU use the energy of electric power charged in the ordinary use capacitor 38. Although FIG. 1 shows that the ordinary use flyback converter FBn supplies electric power to the drive units DU for the upper arm and the lower arm in the U phase only, the ordinary use flyback converter FBn also supplies electric power to the drive units DU for the upper arm and the lower arm in the V and W phases. Actually, the transformer 32 has the six secondary coils. It is also possible for the six lower arms to commonly use the singe secondary coil because the six lower arms have the same voltage potential. In this case, the electric power conversion system has the four secondary coils 32b and the total number of the secondary coils 32b is four.

By the way, the control device 30 receives a detection signal transferred from an acceleration detection means (G sensor 22) and then detects occurrence of a collision with an obstacle (other motor vehicle, etc.) on the basis of the detection value of the G sensor 22. The G sensor 22 as the acceleration detection means detects the acceleration of own motor vehicle on the basis of the force applied to own motor vehicle. When detecting the occurrence of collision, the control device 30 executes an emergency discharging control and executes the capacitor 16 to forcedly discharge the energy stored therein. In the emergency discharging control, the motor vehicle breaks down and there is a possibility for the ordinary flyback converter FBn does not correctly work as the power source of supplying an electric power to the drive units DU. In order to avoid the above emergency, the device according to the present embodiment is equipped with a linear regulator 40 and a flyback converter FBd. The flyback converter FBd is used to discharge the capacitor 16, and receives the output of the linear regulator 40. The linear regulator 40 decreases the voltage of the capacitor 16.

The linear regulator 40 has a series connection unit which is comprised of a plurality of resistances 44 (the four resistances 44 are shown) and a zener diode 48. The series connection unit is connected in parallel to the capacitor 16. Each of the resistances 44 is connected in parallel to a N channel metal oxide field effect transistor (switching elements 42). The resistance 44 having a highest voltage potential is connected to a connection node between an input terminal and a conductive control terminal of the switching element 42 having the highest voltage potential. The conductive control terminals of the switching elements 42 having an intermediate voltage potential are connected through the resistance 44. The resistance 46 is connected to a connection node between a conductive connection node and an output terminal of the switching element 46 having a lowest voltage potential.

The zener diode 48 is connected in parallel to an input terminal and an output terminal of a secondary photo transistor in a photo coupler 54. When the photo coupler 54 is turned on, the zener diode 48 is turned off, and the switching element 42 is turned off. On the other hand, when the photo coupler 54 is turned off, the zener diode 48 is turned on, and the output voltage of the linear regulator 40 is increased to a breakdown voltage of the zener diode 48. The current flows in the resistance 46 when an output current of the linear regulator 40 exceeds zero. The voltage drop of the resistance 46 turns on the switching element 42 having the lowest voltage potential. At this time, the resistance 44 having the intermediate voltage potential can adjust to the voltage generated by the voltage drop at the resistance 46 the voltage between the input terminal and the conductive control terminal of the switching elements 42 other than the switching element 42 having the lowest voltage potential. All of the switching elements 42 are thereby turned on. At this time, these switching elements 42 operates under their saturated state, the voltage between the output terminal and the input terminal of each of the switching elements 42 approximately has the voltage which is obtained by dividing a subtracted voltage by the number of the switching elements 42, where the subtracted value is obtained by subtracting the breakdown voltage of the zener diode 48 from the voltage of the capacitor 16.

The photodiode at the primary side of the photo coupler 54 is turned on when an emergency discharge instruction signal dis output from the control device 30 is switched to a logical high level "H". The emergency discharge instruction signal dis keeps the logical high level "H" unless the own vehicle collides with an obstacle while the control device 30 works. This means that the turned-on state of the linear regulator 40 is maintained even if the control device 30 cannot control the photo coupler 54 when a collision occurs.

On the other hand, the primary coil 60a in the flyback converter FBd for discharging use charges the energy of electric power supplied from the linear regulator 40 when the electric power switching element 64 is turned on. At this time, the diode 66 prevents the current output of the secondary coil 60b in the transformer 60 from flowing. When the electric power switching element 64 is turned off, the current starts to flow through the diode 66 into the capacitor 68 for discharging use. The drive unit DU in the lower arm adjusts a duty ratio of ON time per one period of turning on-off of the electric power switching element 64 so that the output voltage (output voltage of the capacitor 68 for discharging use) of the flyback converter FBd for discharging use becomes approximately equal to the output voltage of the linear regulator 40. This control process is executed when the output voltage of the linear regulator 40 is supplied to the drive unit DU in the lower arm in the U phase.

Figure 2:
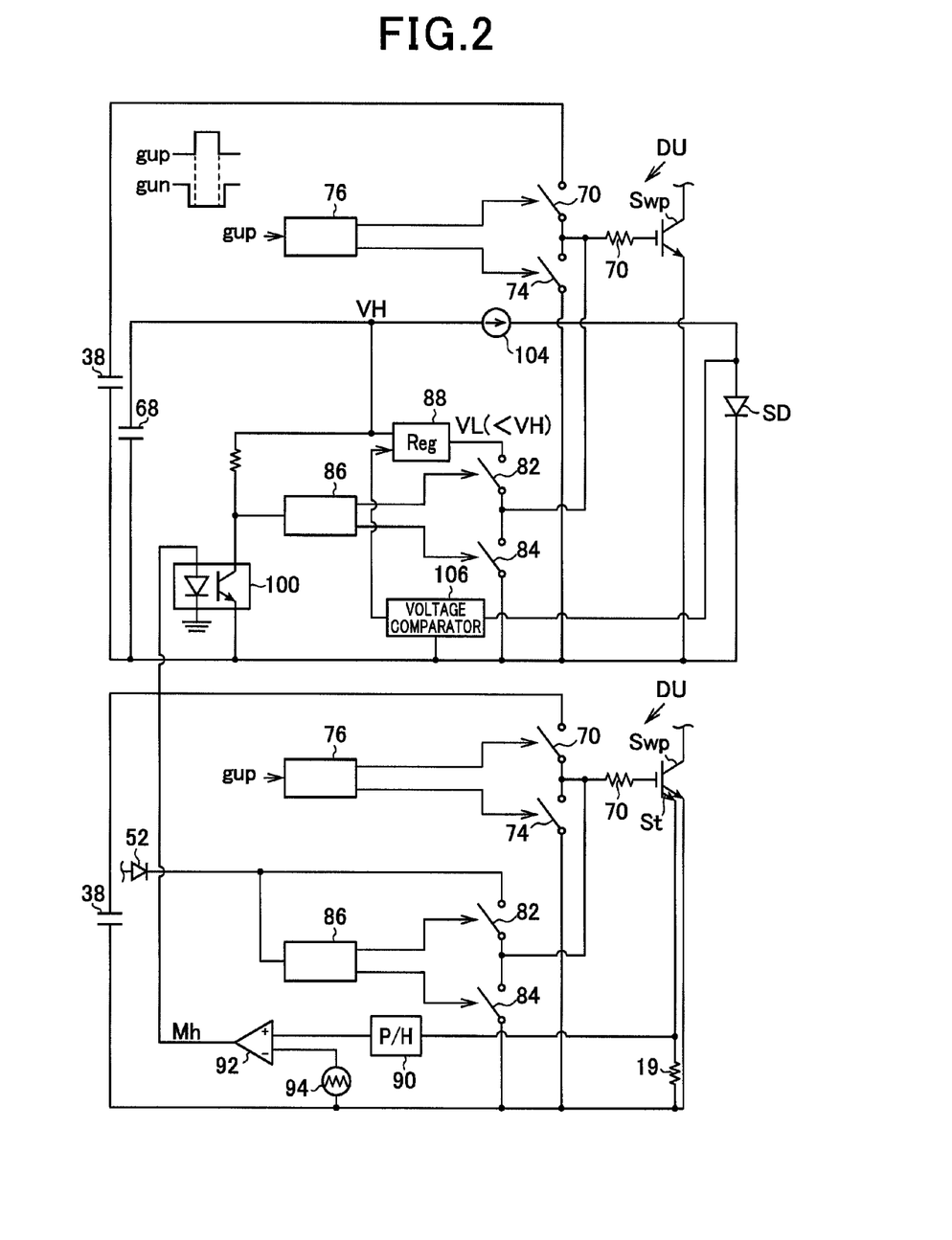
FIG. 2 is a view showing a configuration of a drive circuit in the electric power conversion system equipped with the discharge control device according to the first embodiment.

FIG. 2 is a view showing a configuration of a drive circuit in the drive unit DU for the switching element Sw# in the U phase. In particular, the drive circuit is capable of turning on/off the switching element Sw#.

In each of the drive units for the upper and lower arms in the U phase, the voltage of the capacitor 38 for ordinary-use is applied to the conductive control terminal (gate) of the switching element Sw# through the switching element 70 to be used for charging and the gate resistance 72. In addition, the gate of the switching element Sw# is connected to the output terminal (emitter) of the switching element Sw# through the gate resistance 72 and the switching element 74 for discharging use. This makes the discharging path of the gate of the switching element Sw#. The drive control unit 76 turns on and off the switching element 70 for charging use and the switching element 74 for discharging use on the basis of the operation signals gu#. The switching element Sw# is turned on and off by the drive control unit 76 for ardinary-use.

The drive unit DU in the U phase is equipped with a special circuit which can turn on and off the switching element Sw# when the emergency discharging instruction signal dis becomes a logical low value and the linear regulator 40 is thereby turned on, and the capacitor 68 for discharging use is charged.

In the drive unit DU at the bottom arm of the U phase, the output voltage (output voltage of the diode 52) of the liner regulator 40 is supplied to the gate 72 of the switching element Swn through the switching element 82 for charging use and the gate 72. The gate of the switching element Swn is connected to the emitter thereof through the gate resistance 72 and the switching element 82 for discharging use. When receiving the output voltage of the linear regulator 40, an emergency drive control unit 86 turns on the switching element 82 for charging use and the switching element 84 for discharging use.

On the other hand, the voltage drop of the shunt resistance 19, which is caused by a small current output through a sense terminal St of the switching element Swn at the low voltage side, is supplied to a non-inverted input terminal of a comparator 92 through a peak hold circuit 90. An output signal (carrier) of an oscillator 94 is supplied to an inverted input terminal of the comparator 92. The oscillator 94 generates a signal of a predetermined frequency. The comparator 92 outputs a logical high H value to the photo couplet 100 when the voltage drop value of the shunt resistance 19 is larger than the output signal (carrier) of the oscillator 94.

On the other hand, in addition to the switching element 82, the switching element 84 for discharging use and the emergency drive control unit 86, the drive unit DU in the upper arm of the U phase is equipped with a regulator 88 between the capacitor 82 for charging use and the capacitor 68 for discharging use. The regulator 88 decreases the voltage VH of the capacitor 68 for discharging use. On the other hand, the output signal of the comparator 92 is output as a heat-generation suppressing operation signal Mh to the photo diode at the primary side of the photo coupler 100. The output terminal at the secondary side of the photo coupler 100 is connected to the emitter of the switching element Swp. The input terminal of the photo coupler 100 is connected to the capacitor 68 for discharging use through the resistance. The output terminal of the photo coupler 100 is input to an emergency drive control unit 56 in the upper arm. This makes it possible to turn on the switching element Swp at the high voltage side while the photo coupler 100 is turned off.

A temperature sensitive diode SD is placed near the switching element Swp at the high voltage side. The temperature sensitive diode SD detects a temperature of the switching element Swp at the high voltage side. In more detail, the cathode of the temperature sensitive diode SD is connected to the emitter of the switching element Swp, and the anode of the temperature sensitive diode SD is connected to the output terminal of a constant current circuit 104. The capacitor 68 for discharging use supplies electric power to the constant current circuit 104. The voltage at the anode of the temperature sensitive diode SD is supplied to a voltage comparison circuit 106. The output signal of the voltage comparator 106 is supplied to the regulator 88. The regulator 88 adjusts the output voltage VL (<VH) on the basis of the temperature detected by the temperature sensitive diode SD. There is a negative relationship between the output voltage of the temperature sensitive diode SD and the detected temperature of the detection target.

Figure 3:
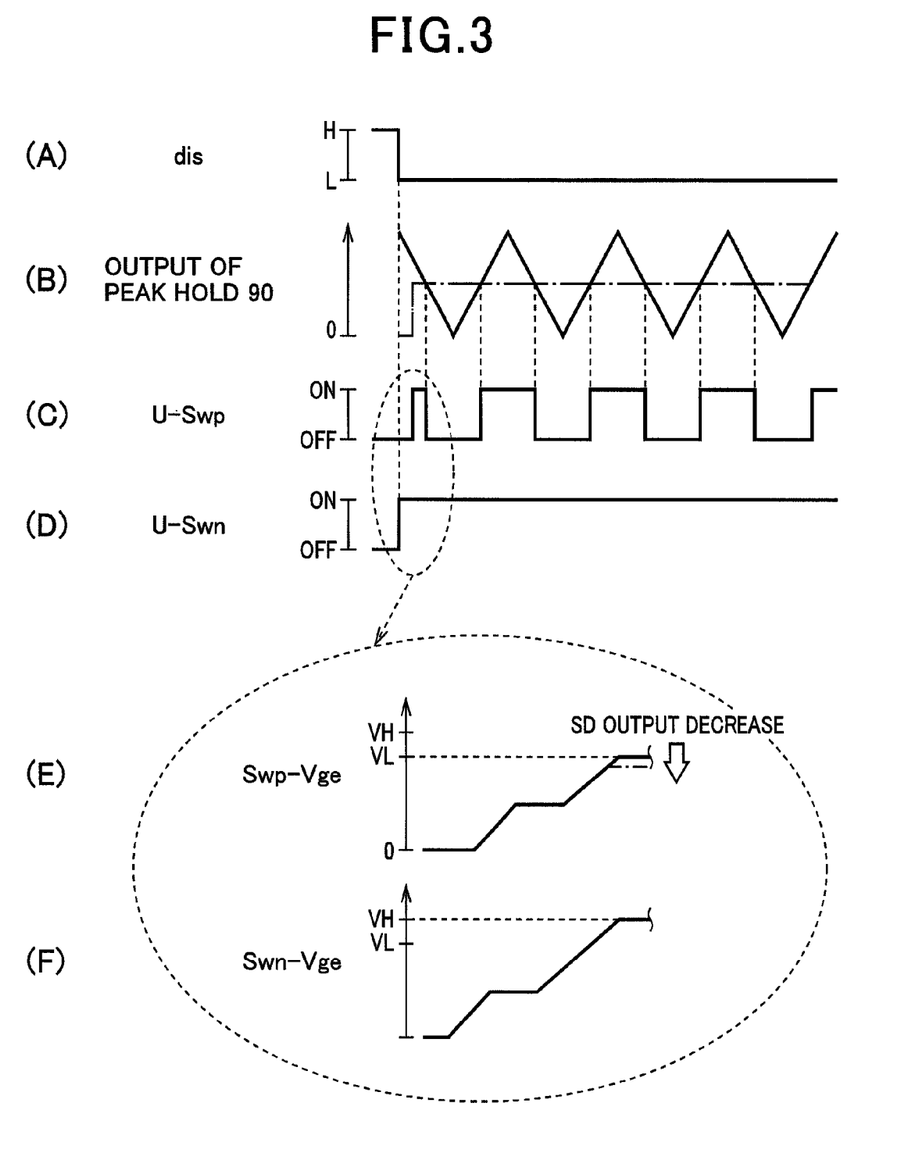

FIGS. 3(A) to (F) are timing charts showing the discharge control on the basis of the emergency discharging instruction signal dis. In more detail, FIG. 3(A) is a view showing the transition of the emergency discharging instruction signal dis. FIG. 3(B) is a view showing the transition of the output signal (designated by the dash and dotted line) of the peak hold circuit 90 and carrier as the output of the oscillator 94. FIG. 3(C) is a view showing the transition of the switching element Swp at the high voltage side in the U phase. FIG. 3(D) is a view showing the transition of the switching element Swn at the low voltage side. In the present embodiment, the switching element Swp at the high voltage side is periodically turned on and off while maintaining the turned-on state of the switching element Swn at the low voltage side in the U phase. This makes it possible to have a period in which the switching element Swp at the high voltage side and the switching element Swn at the low voltage side are turned on simultaneously. During this period, the capacitor 16 is discharged when a short circuit between the electrodes of the capacitor 16 is made through the switching elements Swp and Swn.

Because the drive unit DU has the configuration previously described, previously shown in FIG. 2, the voltage supplied to the gate of the switching element Swp at the high voltage side is lower than the voltage applied to the gate of the switching element Swn at the low voltage side, as shown in FIG. 3(E) and FIG. 3(F). FIG. 3(E) is a view showing the transition of the gate-emitter voltage Vge of the switching element Swp at the high voltage side. FIG. 3(F) is a view showing the transition of the gate-emitter voltage Vge of the switching element Swn at the low voltage side.

Figure 4:
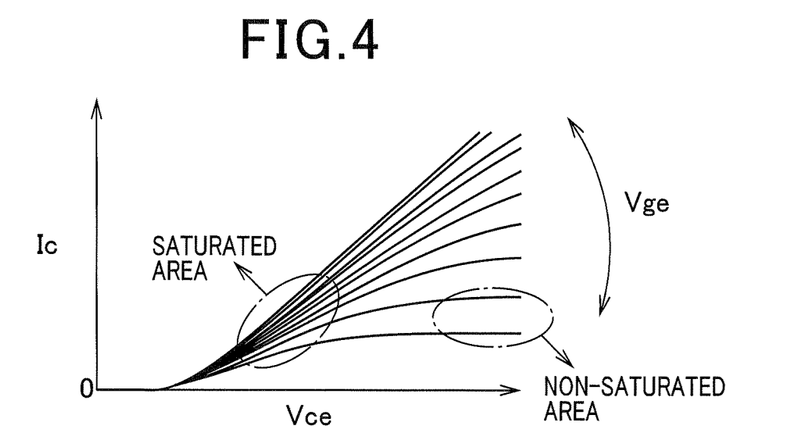
FIG. 4 is a view showing a relationship between an applied gate voltage and a current of a switching element forming the electric power conversion circuit in the electric power conversion system equipped with the discharge control device according to the first embodiment.

According to the configuration of each of the drive units DU, the switching element Swp at the high voltage side is driven in its unsaturated zone, and the switching element Swn at the low voltage side in the its saturated zone. As shown in FIG. 4, the saturate zone of the switching element Sw# indicates a zone in which the voltage Vce between the input and output terminals (the voltage Vce between the collector and the emitter) of the switching element is increased according to the output current (collector current Ic). On the other hand, the un-saturated zone of the switching element Sw# is a zone in which the input and output terminals (the collector and the emitter) of the switching element is increased without increasing the collector current. The more the voltage applied to the gate (the voltage Vge between the gate and the emitter) of the switching element Sw# increases, the more the collector current Ic in the un-saturated zone increases.

When it is controlled so that the voltage applied to the gate of the switching element Swp at the high voltage side becomes lower than the voltage applied to the gate of the switching element Swn at the low voltage side, it is possible for the switching element Swp at the high voltage side to have a current during its un-saturated zone which is smaller than the current flowing in the switching element Swn at the low voltage side. This makes it possible to execute the discharge control in order to limit the current flowing through the switching element Swp at the high voltage side and the switching element Swn at the low voltage side by the current flowing through the switching element Swp at the high voltage side during the un-saturated zone. It is preferable to control the current flowing through the switching element Swp at the high voltage side in the un-saturated zone so that it is less than the threshold current value Ith which is determined by the drive unit DU.

In particular, the temperature sensitive diode SD detects, as the control value, the temperature of the switching element Swp at the high voltage side, the feedback control of the detection value is executed in order to avoid the detected temperature value from taking an excess temperature. The reason why the feedback control value is the temperature of the switching element Swp at the high voltage side is that a large amount of heat energy when the control device 30 executes the discharging control is generated by the switching element Swp at the high voltage side which is driven in the un-saturated zone. As previously described in FIG. 2, the present embodiment uses, as the operation value for the temperature feedback control, the voltage applied to the gate of the switching element Swp. As shown in FIG. 3(E), when the output voltage of the temperature sensitive diode SD is decreased (when the temperature detected by the temperature sensitive diode SD increases), the control device decreases the voltage applied to the gate of the switching element Swp. Because this can decrease the current flowing in the switching element Swp at the high voltage side in the un-saturated zone, it is possible to decrease the discharging current.

Further, as shown in FIG. 3(A) to FIG. 3(F), because the control device 30 executes the discharging control in which the more the output signal of the peak hold circuit 90 increases (the more the discharging current increases), the more the duty ratio of turned-on period per one period of turning on-off of the electric power switching element 64 at the high voltage side decreases. This makes it possible to avoid the heat energy generated in the switching element from extremely increasing per time (one period of carrier).

According to the present embodiment, it is possible to correctly execute the emergency discharging control even if the flyback converter FBn for ordinary use cannot supply the electric power. In particular, when the linear regulator 40 supplies the electric power to the drive unit DU in the bottom arm, it is possible to decrease a necessary voltage resistance between the input and output terminals of each of the switching elements 42 which form the linear regulator 40. Still further, because the flyback converter FBd for discharging use is used as the power source of the switching elements in the upper arm, it is possible to decrease the circuit size of the power source as large as possible.

Figure 5:
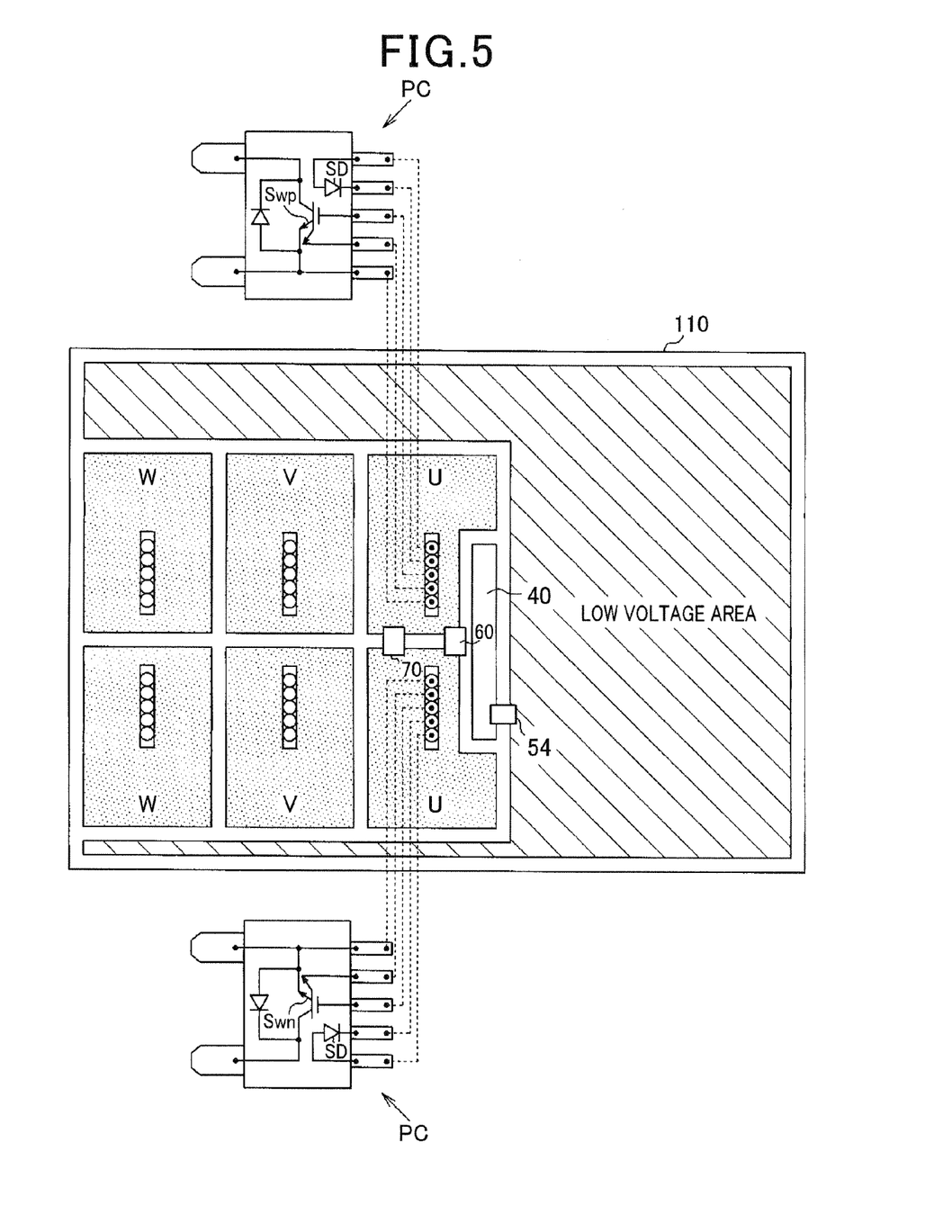
FIG. 5 is a view showing a layout of a circuit substrate on which a series regulator and a transformer are arranged, and the regulator and the transformer form the electric power conversion system equipped with the discharge control device according to the first embodiment.

FIG. 5 is a view showing a layout of a circuit substrate on which a regulator 40 and the transformer 60 are arranged in the discharge control device according to the present embodiment. In this view the power card PC on which a plurality of the switching elements Swp and Swn is arranged at the bottom side below the circuit substrate.

The present embodiment as previously described has the following effects.

(1) The power source for discharging-control use is comprised of the linear regulator 40 and the flyback converter FBd for discharging use. The linear regulator 40 decreases the voltage of the capacitor 16. This configuration of the discharge control device can supply the necessary electric power to the drive units DU with high accuracy even if the own vehicle collides with an obstacle such as another motor vehicle. Further, because the flyback converter FBd for discharging inputs the output of the linear regulator 40, it is possible to decrease the voltage resistance of the flyback converter FBd for discharging use.

(2) The linear regulator 40 is placed between the positive electrode of the capacitor 16 and the input terminal of the inverter IV. The switching elements 42 are connected in series. This makes it possible to decrease the voltage resistance value which is required between the input and output terminals of each of the switching elements 42.

SECOND EMBODIMENT

A description will be given of the second embodiment of the present invention with reference to a diagram by explaining a difference between the first embodiment and the second embodiment.

Figure 6:
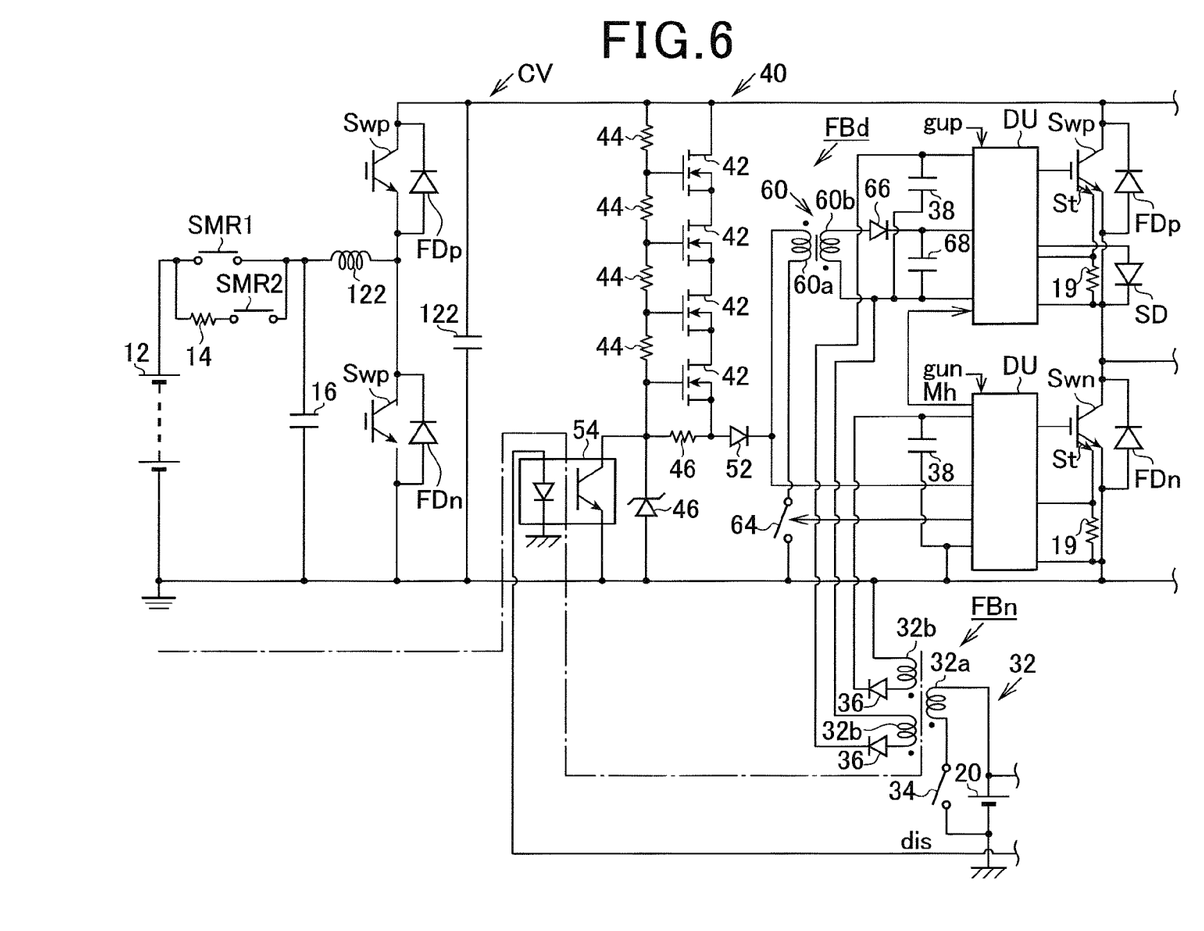
FIG. 6 is a view showing a system configuration of an electric power conversion system equipped with a discharge control device and an electric power conversion circuit (inverter) according to a second embodiment of the present invention.

FIG. 6 is a view showing a system configuration of the discharge control device in the electric power conversion system according to the second embodiment of the present invention. In FIG. 6, the same components between the first embodiment and the second embodiment will be designated by the same reference numbers and characters.

As shown in the view, the booster converter CV is placed between the inverter IV and the high voltage battery 12 in the discharge control device according to the second embodiment. That is, the capacitor 122 is connected to the input terminals of the inverter IV. A series connection unit is connected in parallel to the capacitor 122 and the switching elements Swp and Swn. The series connection unit is comprised of witching elements at the high voltage side and switching elements at the low voltage side. The connection node between the switching element Swp at the high voltage side and the switching element Swn at the low voltage side is connected to the capacitor 16 through a reactor 120. Further, the input terminal of the switching element Swp at the high voltage side is connected to the cathode of a freewheel diode FDp, and the output terminal of the switching element Swn at the low voltage side is connected to the anode of the freewheel diode FDp. Still further, the input terminal of the switching element Swn at the low voltage side is connected to the cathode of a freewheel diode FDn, and the output terminal of the switching element Swn at the low voltage side is connected to the anode of the freewheel diode FDn.

In the above configuration, the voltage of the capacitor 122 is supplied to the linear regulator 40. The voltage of the capacitor 122 is not less than the high voltage battery 12. It is thereby required for each of the switching elements 42 in the linear regulator 40 to have a high voltage resistance. However, because the linear regulator 40 is composed of a plurality of the switching elements connected in series, it is possible to decrease the resistance (or voltage resistance) which is inherent to each of the switching elements 42.

It can be considered to supply the input voltage of the linear regulator 40 to the capacitor 16 in order to charge the capacitor 16. However, this configuration cannot discharge the capacitor 122 because the output voltage of the linear regulator 40 becomes zero when own motor vehicle collides with an obstacle and a short circuit is made between both electrodes of the capacitor 16.

OTHER MODIFICATIONS

It is possible for the discharge control device according to the first and second embodiments to have the following modifications.

(About Linear Regulator)

The present invention does not limit the configuration of the linear regulator 40 shown in FIG. 1, previously described. For example, it is possible for the linear regulator 40 to have a plurality of bipolar transistors as the switching elements 42. In addition, it is preferable to have the switching elements 42, connected in series, of not less than a plural number, other than four.

(About First Power Source)

The present invention does not limit the configuration of the linear regulator 40 which acts as the first power source. For example, it is possible to use an insulation-type converter such as a flyback converter or a non-insulation type converter such as a step down chopper circuit. Further, it is possible to use the first power source as a power source of the drive circuit of the switching elements in the low voltage side.

(Second power source)

It is possible to use a forward converter as the second power source, for example, instead of the flyback converter for discharging use. Further, it is possible to use a level shifter, instead of the insulation type converter, which shifts the voltage potential at the output terminal of the linear regulator 40. It is possible to further use a diode whose forward direction is from the positive electrode of the linear regulator 40 toward the capacitor 68 for discharging use in the upper arm.

(Emergency Discharging Control Means)

It is not necessary to execute the temperature feedback control and the heat energy feedback control.

In order to execute the discharging control by turning on both the switching element Swp at the high voltage side and the switching elements Swn at the low voltage side, it is acceptable to use switching elements Swp and Swn of a booster converter CV, for example, instead of the switching elements Swp and Swn of the inverter IV.

The concept of the present invention is not limited by the process of executing the discharging control by turning on the switching element Swp at the high voltage side and the switching elements Swn at the low voltage side. For example, it is possible to use a circuit capable of supplying a reactive current into the motor generator 10.

Further, the concept of the present invention does not limit the process to turn off the photo coupler 54 in order to execute the discharging control when an emergency occurs. For example, it is acceptable to execute the process to turn off the photo coupler 54 when both conditions are satisfied, one condition is the state when the photo coupler 54 is turned off, and the other condition is the state when the supply of electric power to the capacitor 38 for normal use is stopped.

It is possible to execute the discharging control by turning off the switching element Swp at the high voltage side and the switching elements Swn at the low voltage side simultaneously every switching the relay SMR1 to its turned-off state during the usual state in addition to the emergency state.

(Drive Unit DU)

The present invention does not limit the configuration in which each of the drive units DU in the U phase is composed of the switching elements 70 and 74 for ordinary use and the switching elements 82 and 84 for emergency use, where the switching element 70 is used in charging during the ordinary use, the switching element 74 is used in discharging during the ordinary use, the switching element 82 for charging use during emergency use, and the switching element 84 is used in discharging during emergency use. For example, it is possible for the discharge control device to have different units for supplying a necessary voltage to the input terminal of the switching element for charging use in the upper arm.

It is acceptable not to have the function of forcedly turning off the switching element Sw# when the current is not less than the predetermined threshold current Ith.

(Substrate Layout)

The concept of the present invention is not limited by the layout of the circuit substrate shown in FIG. 5, previously explained. For example, it is acceptable to place the transformer 60 on the area between the U phase area and the V phase area.

(Direct Current to Alternating Current Conversion Circuit)

The concept of the present invention is not limited by the configuration capable of converting electric power between the electric rotary machine as the on-vehicle main engine and the high voltage battery 12. In the direct current to alternating current conversion circuit (Inverter IV), the switching elements at the high voltage side and the switching element at the low voltage side are simultaneously turned on during the discharging control. For example, it is possible to convert electric power between the high voltage battery 12 and an electric rotary machine in an air conditioning system other than the on-vehicle main engine.

It is possible to use a H bridge circuit as the DC to AC conversion circuit instead of the inverter IV.

(About Electric Power Conversion Circuit)

It is acceptable to use a booster converter CV shown in FIG. 6 previously described instead of the direct current to alternating current conversion circuit as the electric power conversion circuit for emergency discharging-control use. It is further possible to use the electric power conversion circuit which is composed of the booster converter CV only, and to directly connect the input terminal of the booster converter CV to the direct current power source (secondary battery). This configuration is efficient as long as the discharge control device executes the discharging control of the capacitor 122.

(Others)

It is possible to use a booster converter without the switching element Swp at the high voltage side in the booster converter CV. The booster converter CV disclosed in the embodiment can work as a back converter.

Figure 7:
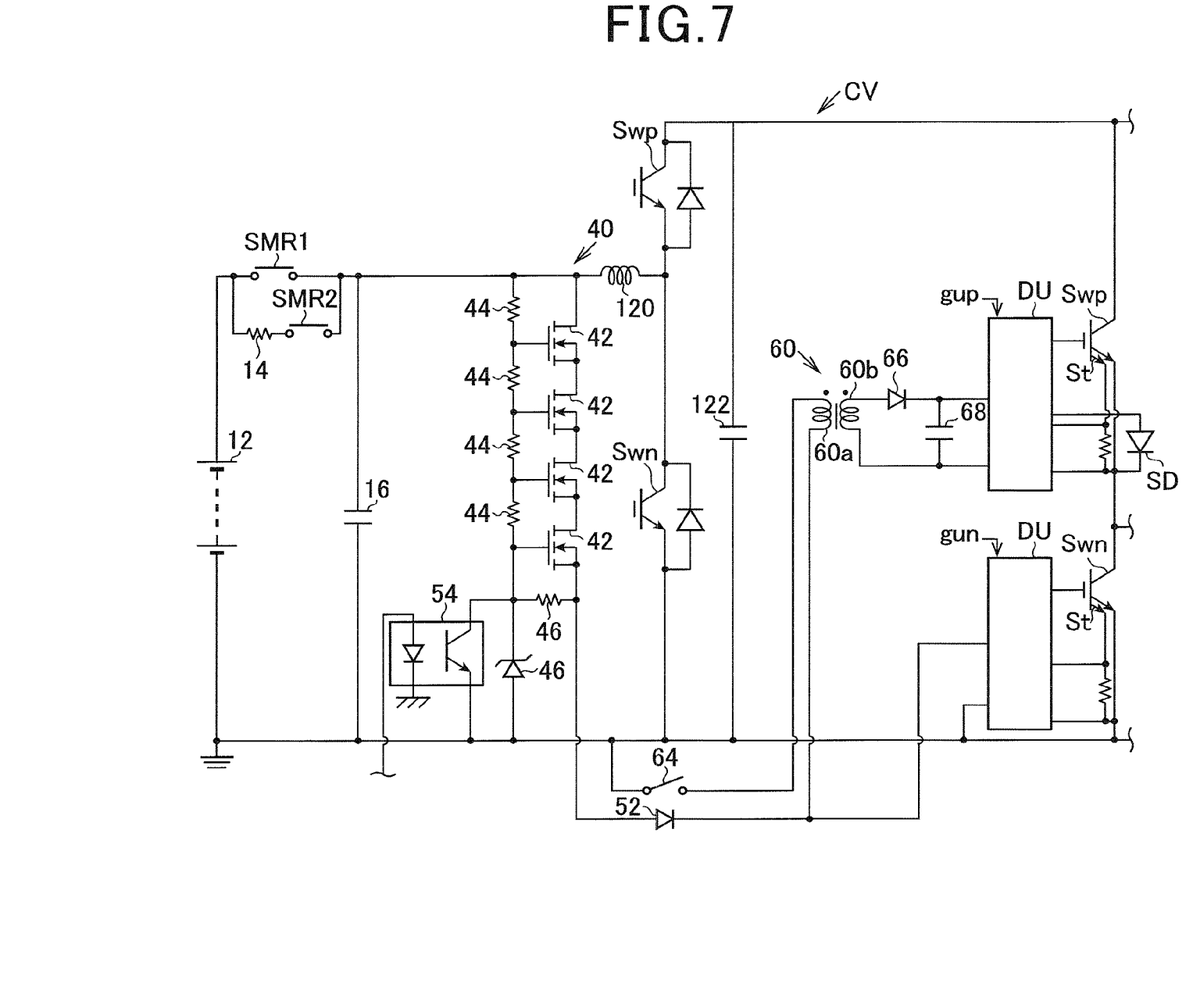
FIG. 7 is a view showing an arrangement of an electric power source of the series regulator, in particular, which forms the discharge control device, as a modification of the electric power conversion system according to the first embodiment and the second embodiment of the present invention. Embodiments to execute the present invention

It is possible for the linear regulator 40 to input the output of the capacitor 16 in the structure of the second embodiment shown in FIG. 7.

It is possible to use, as each of the switching elements Swp at the high voltage side and the switching elements Swn at the low voltage side, a field effect transistor such as a power MOS field effect converter instead of an IGBT.

It is possible to apply the discharge control device according to the present invention to electric vehicles other than hybrid vehicles. The electric vehicles with an on-vehicle main engine which uses electric power only charged in a battery.

The discharging control device can be applied to electric power conversion systems for use in residential buildings and commercial buildings, which convert direct current electric power to alternating current electric power. In this case, the emergency indicates the occurrence of an earthquake, for example.

EXPLANATION OF REFERENCE NUMBERS AND CHARACTERS

10 . . . Motor generator
12 . . . High voltage battery (one embodiment of a direct current power source)
16 . . . Capacitor
30 . . . Control device
40 . . . Linear regulator
FBd . . . Flyback converter for discharging use
Swp . . . Switching element at high voltage side
Swn . . . Switching element at low voltage side
DU . . . Drive unit The scope of claims of the invetion:

1. A discharge control device for an electric power conversion system,
   the electric power conversion system comprising an electric power conversion circuit, a capacitor and an electrical switching device, the electric power conversion circuit being equipped with a series connection unit, the series connection unit comprising a switching element at a high voltage side and a switching element at a low voltage side connected in series, the electric power conversion circuit converting a direct current power of a direct current power source to a predetermined electric power, the capacitor being placed between input terminals of the electric power conversion circuit and the direct current power source in order to smooth the voltage between the input terminals of the electric power conversion circuit, the electrical switching device opens and closes electrical connections between the electric power conversion circuit, the capacitor and the direct current power source,
   the discharge control device comprising a discharge controller, a first power source and a second power source,
   wherein the discharge controller adjusts a charged voltage of the capacitor to a voltage of not more than a predetermined voltage by operating the switching elements at a high voltage side and the switching elements at a low voltage side when the electrical switching device is turned off,
   the first power source receiving the voltage of the capacitor when the capacitor is discharged, and generating a first supplying voltage by decreasing the voltage of the capacitor during the discharge of the capacitor, the first supplying voltage being supplied to a first driving circuit for controlling the switching element at a high voltage side, and
   the second power source receiving the first supplying voltage of the first power source and generating a second supplying voltage based on the first supplying voltage, which is higher than the first supplying voltage, the second supplying voltage being supplied to a second driving circuit for controlling the switching element at a low voltage side.

2. The discharge control device for the electric power conversion system according to claim 1, wherein the second power source comprises an insulation type converter.

3. The discharge control device for the electric power conversion system according to claim 2, wherein the electric power conversion system is an on-vehicle high voltage system which is insulated from an on-vehicle low voltage system, the drive circuit for controlling the switching element at a high voltage side and the drive circuit for controlling the switching element at a low voltage side are arranged adjacent to each other on a circuit substrate,  a transformer forming the insulation type converter is arranged between the drive circuit for controlling the switching element at a high voltage side and the drive circuit for controlling the switching element at a low voltage side.

4. The discharge control device for the electric power conversion system according to claim 1, wherein the first power source is comprised of a linear regulator, and generates a voltage to be supplied to the drive circuit for controlling the switching elements at a low voltage side.

5. The discharge control device for the electric power conversion system according to claim 4, wherein the linear regulator is arranged between the capacitor and the electric power conversion circuit and is comprised of a plurality of switching elements connected in series.

6. The discharge control device for the electric power conversion system according to claim 5, wherein the electric power conversion circuit is a direct current to alternating current conversion circuit connected to an electric rotary machine,  a booster converter is placed between the direct current to alternating current conversion circuit and the direct current power source, and  the capacitor is connected to the output terminal of the booster converter.

7. The discharge control device for the electric power conversion system according to claim 1, wherein the electric power conversion circuit is a direct current to alternating current conversion circuit connected to an electric rotary machine.

8. The discharge control device for the electric power conversion system according to claim 1, wherein the discharge controller turns on the switching element at a high voltage side and the switching element at a low voltage side in order to make a short circuit of both electrodes of the capacitor, and to execute the discharge control of decreasing a voltage charged in the capacitor to a voltage of not more than the predetermined voltage.

9. The discharge control device for the electric power conversion system according to claim 1, further comprising a detector configured to detect whether or not an emergency occurs in a member onto which the electric power conversion system is mounted,  wherein the discharge controller turns on the switching element at a high voltage side and the switching element at a low voltage side in order to make a short circuit between both electrodes of the capacitor and execute the discharge control of decreasing the voltage charged in the capacitor to a voltage of not more than the predetermined voltage when the detector indicates that an emergency occurs in the member.

\* \* \* \* \*